United States Patent
Ando

(10) Patent No.: US 8,825,890 B2
(45) Date of Patent: Sep. 2, 2014

(54) IMAGE PROCESSING DEVICE, CONTROL METHOD THEREFOR AND COMPUTER READABLE MEDIUM

(75) Inventor: Yoshinori Ando, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 523 days.

(21) Appl. No.: 13/157,698

(22) Filed: Jun. 10, 2011

(65) Prior Publication Data

US 2012/0110132 A1    May 3, 2012

(30) Foreign Application Priority Data

Nov. 1, 2010   (JP) ................................. 2010-245564

(51) Int. Cl.
*G06F 15/16* (2006.01)
*G06F 15/167* (2006.01)
*H04L 29/08* (2006.01)

(52) U.S. Cl.
CPC ...................................... *H04L 67/06* (2013.01)
USPC ........................................ 709/232; 709/219

(58) Field of Classification Search
USPC ......................................................... 709/232
See application file for complete search history.

(56) References Cited

U.S. PATENT DOCUMENTS

| 2003/0084123 | A1* | 5/2003 | Kamel | 709/219 |
| 2003/0225824 | A1* | 12/2003 | Wu et al. | 709/203 |
| 2008/0082662 | A1* | 4/2008 | Dandliker et al. | 709/225 |
| 2013/0166764 | A1* | 6/2013 | Boldt | 709/230 |

FOREIGN PATENT DOCUMENTS

| JP | 2005078193 A | 3/2005 |
| JP | 2006-209372 A | 8/2006 |
| JP | 2007088944 A | 4/2007 |

OTHER PUBLICATIONS

Kazutaka Hayashi, "Start Free Home Servedr Easily and Securely using XAMPP," First edition, Japan, Rutles Inc. "Home Server XAMPP" Publication Project, Jan. 5, 2008, First edition, pp. 310-315.

Japanese Office Action dated Jul. 8, 2014 issued in Japanese Patent Application No. 2010-245564.

* cited by examiner

*Primary Examiner* — Shaq Taha
(74) *Attorney, Agent, or Firm* — Sughrue Mion, PLLC

(57) ABSTRACT

There is provided an image processing device including: a transmission unit that transfers data to an FTP server in a specified transmission mode; and a transmission mode specifying unit that initially specifies an active mode for the transmission mode for transferring the data to the FTP server, and if establishing a data transfer connection in an active mode fails, specifies a passive mode for the transmission mode for transferring the data to the FTP server.

9 Claims, 6 Drawing Sheets

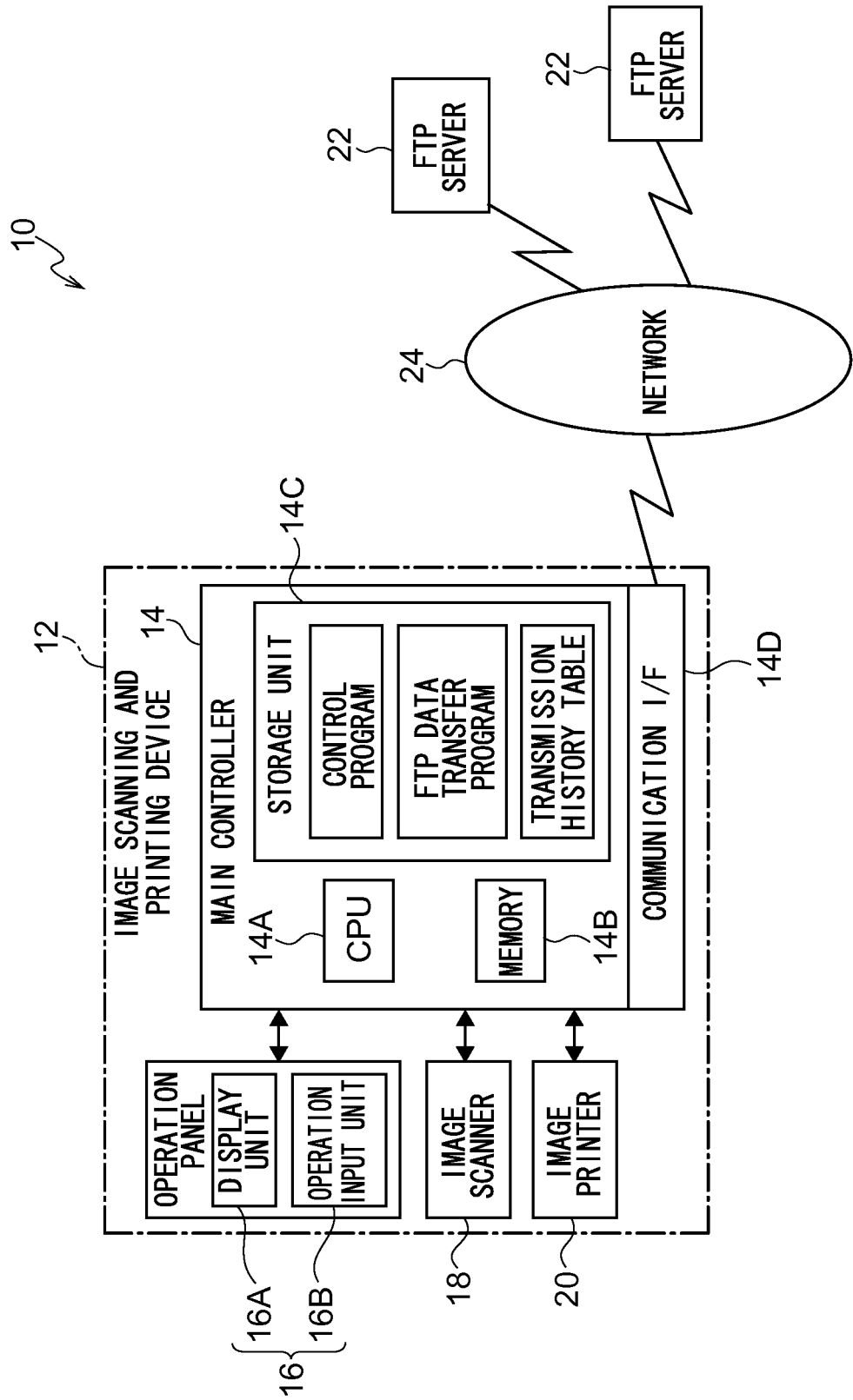

FTP TRANSFER IN PASSIVE MODE

FTP TRANSFER IN ACTIVE MODE

FIG.6

<EXAMPLE OF DATA RECORDED ON TRANSMISSION HISTORY TABLE>

| FTP SERVER ADDRESS | TRANSMISSION MODE | DATA CONNECTION ESTABLISHMENT RESULT |
|---|---|---|
| 129.249.123.vvv | ACTIVE | SUCCESS |
| | PASSIVE | NOT ATTEMPTED |
| 129.249.123.xxx | ACTIVE | FAILURE |
| | PASSIVE | SUCCESS |
| 129.249.123.yyy | ACTIVE | FAILURE |
| | PASSIVE | FAILURE |

IMAGE PROCESSING DEVICE, CONTROL METHOD THEREFOR AND COMPUTER READABLE MEDIUM

CROSS-REFERENCE TO RELATED APPLICATION

This application is based on and claims priority under 35 USC 119 from Japanese Patent Application No. 2010-245564 filed on Nov. 1, 2010.

BACKGROUND

1. Technical Field

The present invention relates to an image processing device, a control method therefor and a computer readable medium.

2. Related Art

There is a known technology for transmitting an image data from an image processing device to an FTP server.

SUMMARY

According to an exemplary embodiment of the present invention, an image processing device includes: a transmission unit that transfers data to an FTP server in a specified transmission mode; and a transmission mode specifying unit that initially specifies an active mode for the transmission mode for transferring the data from the transmission unit to the FTP server, and if establishment of a data transfer connection in an active mode fails, specifies a passive mode for the transmission mode for transferring the data from the transmission unit to the FTP server.

BRIEF DESCRIPTION OF THE DRAWINGS

An exemplary embodiment of the present invention will be described in detail based on the following figures, wherein:

FIG. 1 is a block diagram illustrating principal structures of the computer system described in the embodiments.

FIG. 6 is a table illustrating an example of data recorded on the transmission history table.

DETAILED DESCRIPTION

Figure 2A:
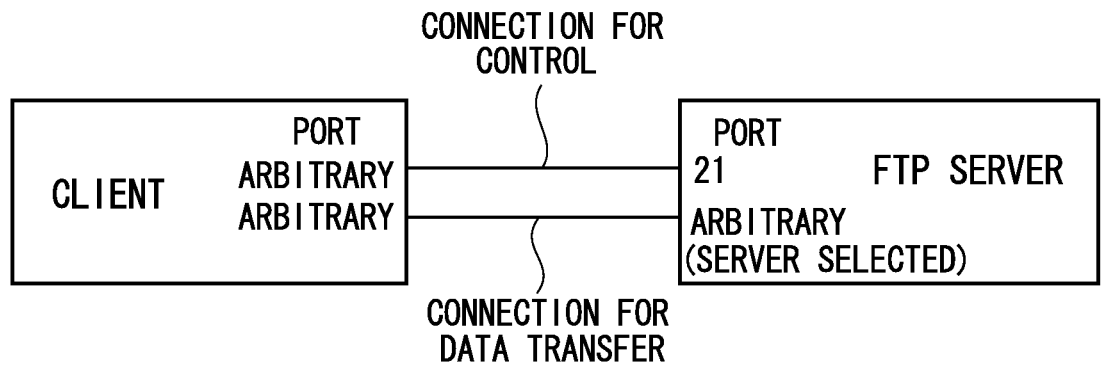
FIG. 2A is an explanatory diagram for an FTP transfer in a passive mode.

FIG. 1 shows a computer system 10 according to an exemplary embodiment. The computer system 10 is configured to include an image scanning and printing device 12 and plural FTP servers 22 or unillustrated other servers, which are connected to one another via a network 24. The network 24 may be one of: LAN (local-area network) such as an intranet, the internet, or a network including LAN and the internet. The computer system 10 may also include plural image scanning and printing devices 12. Furthermore, a firewall and the like maybe configured between the image scanning and printing device 12 and the network 24.

The image scanning and printing device 12 is configured as a microcomputer and the like and includes a CPU 14A, a memory 14B, and a main controller 14 which includes a non-volatile storage unit 14C configured by an HDD (Hard Disk Drive) or a flash memory and the like, and a communication I/F (interface) 14D.

Furthermore, an operation panel 16, an image scanner 18, an image printer 20 are respectively connected to the main controller 14. The operation panel 16 includes a display unit 16A configured by an LCD and the like, and an operation input unit 16B configured by a ten key or a touch panel and the like. The image scanner 18 scans an image of a document by photoelectric converters and outputs the result as an image data file. The image printer 20 prints the image corresponding to an input image data to a recording medium. The image printer 20 may generate an image by electrophotography. The generated image may thereafter be transferred and fixed to a recording medium. Alternatively, the image scanner 20 may adopt an inkjet printing method in which ink droplets are ejected from plural nozzles, thereby recording an image onto a recording medium. Any existing method can be adopted for recording an image onto the recording medium.

A control program and an FTP data transfer program are respectively installed onto the storage unit 14C in the main controller 14. The control program executes control processing that controls the operation of the respective components of the image scanning and printing device 12. The FTP data transfer program executes the FTP data transfer processing described below. The FTP data transfer program is an example of a control program for the image processing device according to the exemplary embodiments. Since the CPU 14A executing the FTP data transfer program, the main controller 14 (the image scanning and printing device 12) functions as an example of the image processing device according to the exemplary embodiments. Moreover, a transmission history table (whose detail is described in FIG. 6 and below) is stored in the storage unit 14C.

Each FTP server 22 includes a main computer having a CPU, a memory, a non-volatile storage unit configured by an HDD or a flash memory and the like, and a communication I/F. The main computer of the FTP server is connected to the network 24 via the communication I/F. The storage unit of the main computer of the FTP server includes programs that permit the respective main computer to function as an FTP server. Moreover, the storage unit of the main computer of the FTP server has a storage region for storing data (file) uploaded (transferred) from the image scanning and printing device 12 via the network 24.

Next, the operation of the exemplary embodiment is described. The image scanning and printing device 12 according to the exemplary embodiment includes a function (scan-to-server function) which transfers, via FTP transmission, an image data file that is scanned from a document by the image scanner 18, to a specified FTP server 22. In the below, FTP transmission is described first.

Figure 3A:
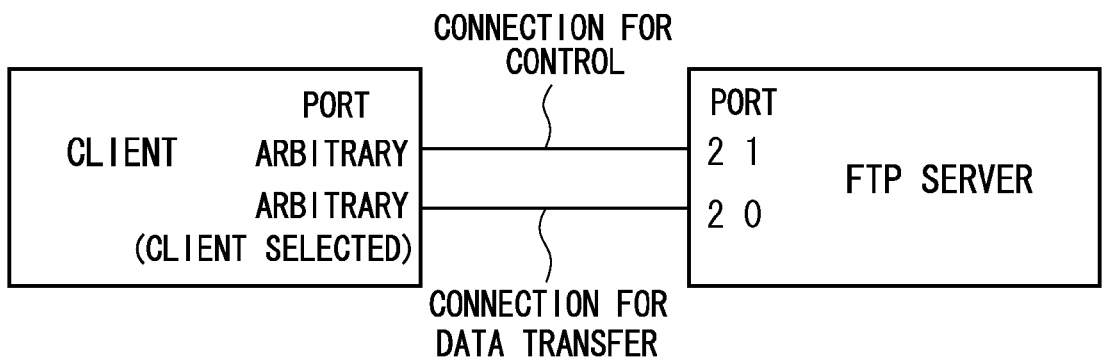
FIG. 3A is an explanatory diagram for an FTP transfer in an active mode.

FTP transmission realizes a file transfer function by establishing two TCP connections between the FTP server and the client (a control connection and a data transfer connection, as shown, for instance, in FIGS. 2A and 3A). In an FTP transmission, a control connection is first established between the FTP server and the client, and thereafter, a data transfer connection is established each time a necessity for transferring a file (data) occurs, and the data transfer connection is closed each time the transferring of the file (data) is completed. FTP transmission further includes two types of transmission modes called a passive transmission mode and an active transmission mode.

In a passive transmission mode, as shown in FIG. 2A, a port with a port number 21 is fixedly used at the FTP server side for the control connection for an FTP transmission. On the other hand, a port having a port number specified by the FTP server is used for the data transfer connection. Moreover, the ports at the FTP server side that are closed after being used for data transfer are released after a predetermined period of time passes.

Due thereto, in a case, for instance, when transferring (e.g. uploading) a file from the client to the FTP server in a passive transmission mode, if the transferred file is configured from separate files each corresponding to a single page of a plural pages of a document that are scanned and divided into single page units (e.g. plural files with each being formed by a single page), establishment of a data transfer connection, the data transfer and closing the data transfer connection are repeated for each single page associated with each file. Furthermore, since ports at the FTP server side with distinct port numbers are used for every data transfer connection, the resources for transmission and the like at the ports may be exhausted.

In regards to the above, plural files with each being formed by a single page may be gathered into an archive to be transferred to the FTP server in a single transfer. In such a case, the resources for transmission and the like at the ports may be prevented. However, the FTP server that received the file would need to decompress the archived files, thereby increasing the load of the FTP server.

Figure 2B:
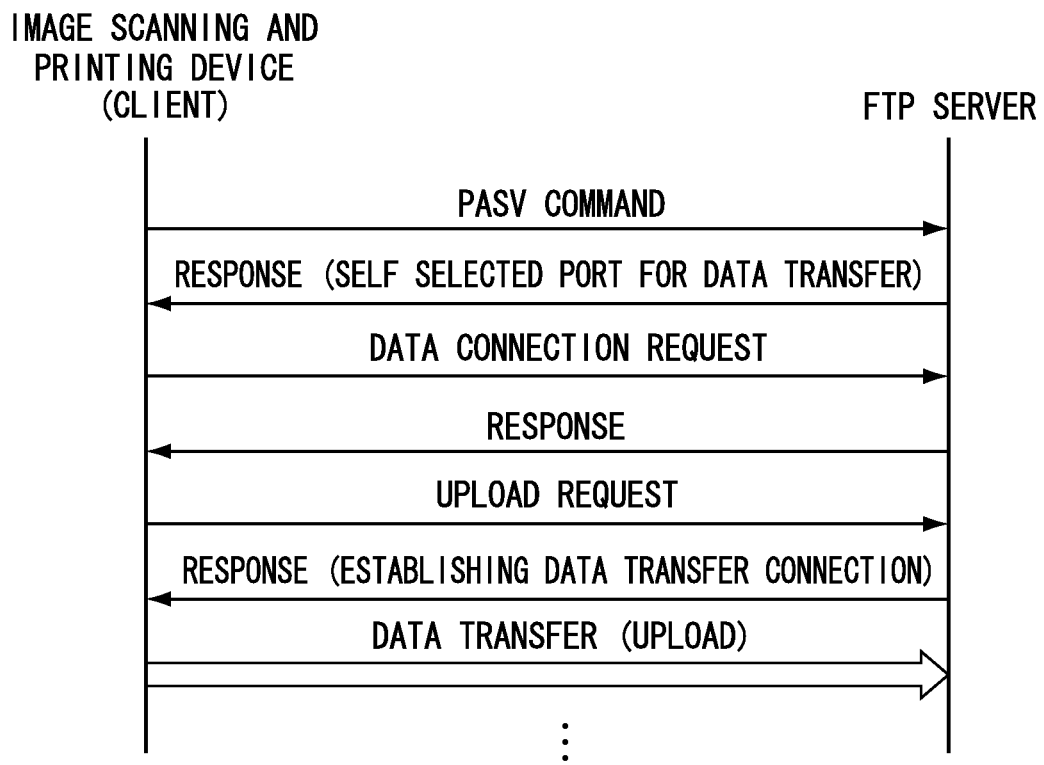
FIG. 2B is an explanatory diagram for an FTP transfer in a passive mode.

On the other hand, in a passive transmission mode, as shown in FIG. 2B, a sequence of operations is performed in which the client transmits data connection requests to the FTP server. Therefore, even if a firewall between the client and the ftp server is disposed so as to limit an access from a third party to the client, the probability that a response and the like sent from the FTP server to the client is intercepted may be low. Accordingly, in a passive transmission mode, an FTP transmission may succeed with high probability regardless of the network configuration (such as the presence of a firewall) at the client side.

Furthermore, as shown in FIG. 3A, in an active transmission mode, at the FTP server side, a port with port number 21 is fixedly used for a control connection and a port with port number 20 is fixedly used for a data transfer connection, respectively, during the FTP transmission. Due thereto, in an active transmission mode file transfer (e.g. upload) from the client to the FTP server, even if the transferred file is the aforementioned plural files with each file being formed by a single page so that establishment of a data transfer connection, the data transfer and closing the data transfer connection are repeated for each single page associated with each file, the port number of the port that is used at the FTP server side for a data transfer connection is the port number 20 and remains unchanged. Therefore, exhaustion of the resources for transmission and the like at the ports do not occur.

Figure 3B:
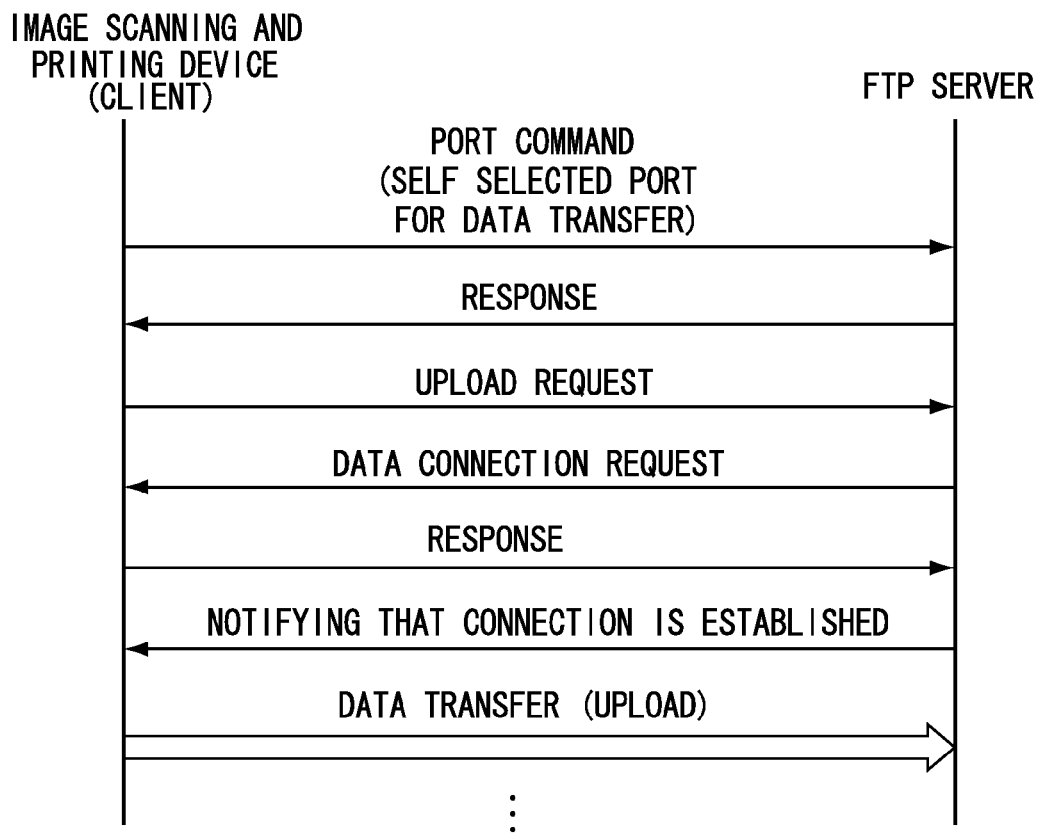
FIG. 3B is an explanatory diagram for an FTP transfer in an active mode.

On the other hand, as shown in FIG. 3B, in an active transmission mode, a sequence of operations are performed in which the FTP server transmits a data connection request to the client. Due thereto, if a firewall between the client and the ftp server is disposed so as to limit an access from a third party to the client, the probability that a data connection request and the like sent from the FTP server to the client is intercepted may be high. Accordingly, there is a probability that an FTP transmission may fail depending on the network configuration (such as the presence of a firewall) at the client side.

Figure 4:
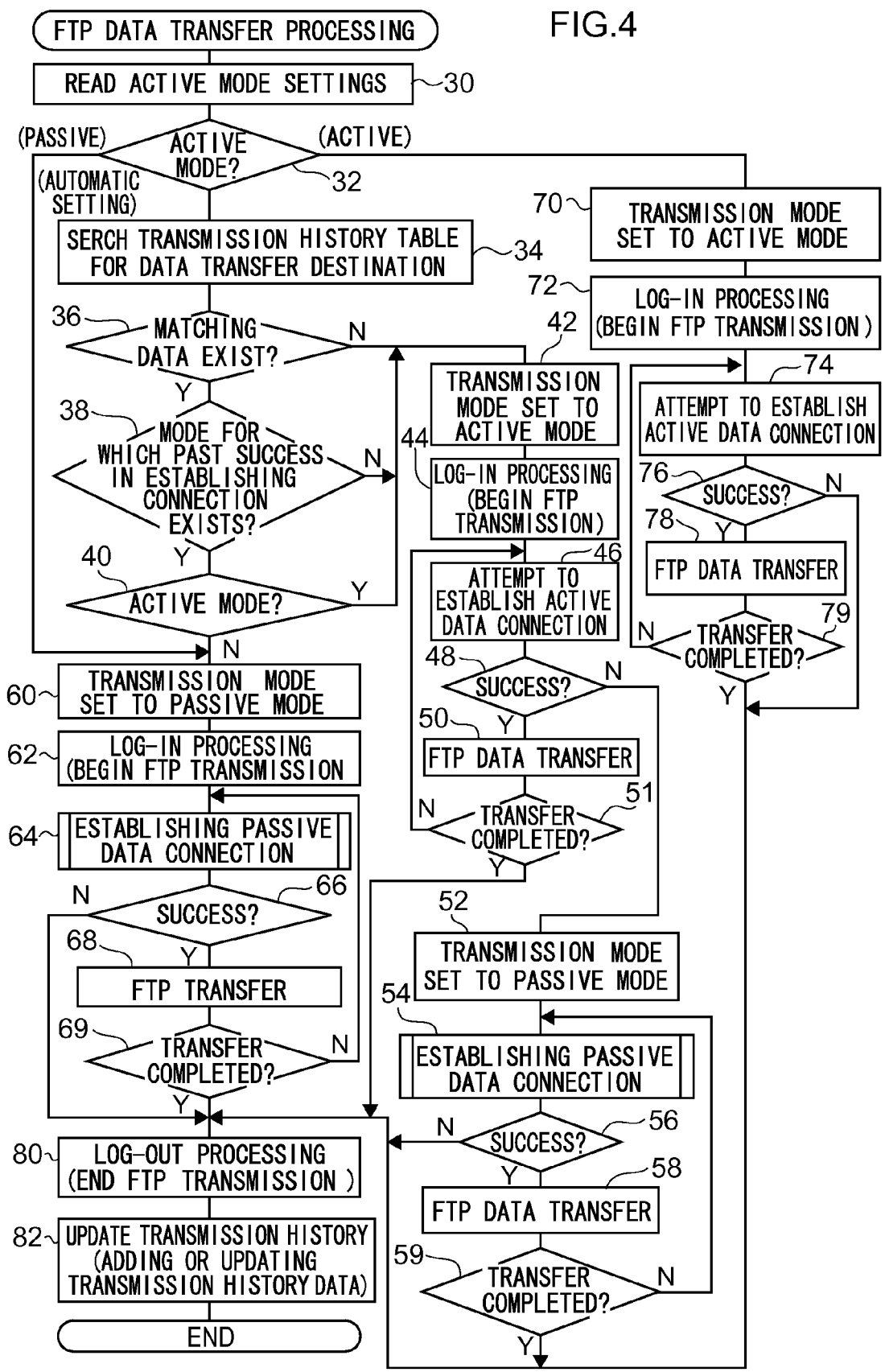
FIG. 4 is a flowchart illustrating the process of an FTP data transfer processing.

Due thereto, in an image scanning and printing device 12 according to the exemplary embodiment, a sequence of operations is to be performed in the following order via the operation input unit 16B of the operation panel 16: an operation for instructing an execution of the process adopting a scan-to-server function (scan-to-server processing), an operation for specifying the destination FTP server 22 to which an image data file is transferred, and an operation for instructing the scanning of a document by the image scanner 18. Due thereto, when an image data file is acquired via the image scanner 18 scanning an image of a document, an FTP data transfer processing as shown in FIG. 4 is performed as the CPU 14A of the main controller 14 executes the FTP data transfer program.

In the FTP data transfer processing, in step 30, the CPU 14A reads a setting for operational modes of the scan-to-server processing from the storage unit 14C. In an image scanning and printing device 12 according to the exemplary embodiment, three types of modes that include an active mode, a passive mode and an automatic setting mode are disposed that serve as operational modes of the scan-to-server processing. The active mode is a mode in which only the FTP transmission associated with the active transmission mode is executed during the scan-to-server processing. On the other hand, the passive mode is a mode in which only the FTP transmission associated with the passive transmission mode is executed during the scan-to-server processing. Furthermore, the automatic setting mode is a mode which switches between the active transmission mode and the passive transmission mode for the FTP transmission during the scan-to-server processing.

In the next step 32, the control flow for the CPU 14A branches based on the operational mode setting for the scan-to-server processing that is acquired in step 30, which is determined to be one of an active mode, a passive mode or an automatic setting mode. If the operational mode for the scan-to-server processing is set to an automatic setting mode, the CPU 14A proceeds from step 32 to step 34 and searches for whether or not a transmission history data associated with the FTP server 22, which is specified as the data transfer destination for the current scan-to-server processing, is recorded on the transmission history table. Then, in the next step 36, the CPU 14A determines whether or not the matching transmission history data has been extracted by the search performed in step 34.

As an example, as shown in FIG. 6, the transmission history table records, for each of the FTP servers 22 to which the image scanning and printing device 12 has transferred data in the past, a transmission history data that includes: an IP address of the destination FTP server 22; and the result of establishing a data transfer connection for each of the transmission modes with the destination FTP server 22. Accordingly, if the FTP server 22 that is specified as the destination of a data transfer of the current scan-to-server processing has not been specified as the destination of a data transfer in the past, the result of step 36 is negative and the CPU 14A proceeds to step 42.

On the other hand, if the FTP server 22 has been specified as the destination of a data transfer in the past, the result of step 36 is positive and the CPU 14A proceeds to step 38. Then, in step 38, the CPU 14A determines whether or not the transmission history data extracted by the search in step 34 includes a transmission mode for which establishment of a data transfer connection has succeeded in the past. In an example of a transmission history table as shown in FIG. 6, the FTP server 22 having an IP address of "129.249.123.yyy" failed to establish a connection in the previous data transfer according to an active transmission mode and a passive transmission mode. Accordingly, if this FTP server is specified as the destination of the data transfer for the current scan-to-server processing, the result of step 38 is negative and the CPU 14A proceeds to step 42.

On the other hand, if the FTP Server 22 having an IP address of "129.249.123.vvv" is specified as the destination of the data transfer for the current scan-to-server processing, since this FTP server 22 has succeeded in establishing a data transfer connection in a previous data transfer in an active transmission mode as shown in FIG. 6, the result of step 38 is positive. Moreover if the FTP Server 22 having an IP address of "129.249.123.xxx" is specified as the destination of the data transfer for the current scan-to-server processing, since this FTP server 22 has succeeded in establishing a data transfer connection in a previous data transfer in the passive transmission mode as shown in FIG. 6, the result of step 38 is also positive, In a case the result of step 38 is positive, the CPU 14A proceeds to step 40, and determines, for the FTP server 22 specified as the destination for the data transfer for the current scan-to-server processing, whether or not the transmission mode in which the data transfer connection during the previous data transfer has succeeded is an active transmission mode. If the determination result is positive, the CPU 14A proceeds to step 42. If the determination result is negative, the CPU 14A proceeds to step 60.

As mentioned above, the CPU 14A proceeds to step 42 if the result step 36 or step 38 is negative or if the result of step 40 is positive. In step 42, the CPU 14A sets an active transmission mode for the FTP transmission mode. In the next step 44, the CPU 14A begins an FTP transmission with the FTP server 22 specified as the data transfer destination and performs a log-in processing at the specified FTP server 22 in order to establish a control connection with the specified FTP server 22. At step 46, by performing a transmission according to the sequence as shown in FIG. 3, an attempt is made to establish a data transfer connection with the specified FTP server 22 in an active transmission mode.

In the next step 48, based on whether or not the sequence has proceeded up to the point at which a notification for establishing a connection is received from the specified FTP server 22, the CPU 14A determines whether or not a data transfer connection has been successfully established with the specified FTP server 22. If the determination result at step 48 is positive, the CPU 14A proceeds to step 50 and performs an FTP data transfer processing for transferring an image data file to the FTP server 22 via the data transfer connection that was established as above. When the transfer of the image data file completes and the data transfer connection closes, the CPU 14A proceeds to step 51 and determines whether or not all of the image data files to be transferred has been transferred to the FTP server 22. If the determination result is negative, the CPU 14A returns to step 46 and repeats steps 46 through 51 until the result of step 51 becomes positive. If the determination result at step 51 is positive, the CPU 14A proceeds to step 80 and performs a log-out processing from the FTP server 22, thereby closing the control connection and ending the FTP transmission to the specified FTP server 22.

Thereafter, at the next step 82, the CPU 14A updates the transmission history table and ends the FTP data transmission processing. If, in an update processing of the transmission history table at step 82, the FTP server 22 to which the data is transferred for the current scan-to-server processing has not been specified as a destination of a data transfer in the past, the CPU 14A respectively records: the IP address of the data transfer destination FTP server 22; a "success" for the result of establishing a data transfer connection in an active transmission mode; and a "not attempted" for the result of establishing a data transfer connection in a passive transmission mode. Further, if the data transfer destination FTP server 22 has been specified as a destination of a data transfer in the past, the transmission history data recorded in association with the IP address of the data transfer destination FTP server 22 is updated (in the present case, the result of establishing a data transfer connection in an active transmission mode is overwritten by a "success").

Accordingly, FTP transmission in an active transmission mode has a higher priority for cases in which: (1) the data transfer destination FTP server 22 for the current scan-to-server processing has not been specified as a destination of a data transfer in the past (the case in which the determination result of step 36 is negative); (2) the CPU 14A has failed to establish a data transfer connection both in an active transmission mode and the passive transmission mode in a previous data transfer to the data transfer destination FTP server 22 of the current scan-to-server processing (case in which the determination result of step 38 is negative); and (3) the CPU 14A has succeeded in establishing a data transfer connection in an active transmission mode in a previous data transfer to the data transfer destination FTP server 22 of the current scan-to-server processing (the case in which the determination result of step 40 is negative). By attempting to establish a data transfer connection with the FTP server 22 in an active transmission mode and if this succeeds, the image data file is transmitted via the FTP transmission. Therefore, in a network environment in which FTP transmission in an active transmission mode is available, by selecting the active transmission mode, the resources for transmission at the FTP server 22 during an FTP transmission is prevented from being exhausted.

On the other hand, in a case, for instance, when the image scanning and printing device 12 is connected to the network 24 via a firewall or the like so that the network environment does not permit FTP transmission in an active transmission mode, a data transfer connection in an active transmission mode is not established with the FTP server 22 and the determination result of step 48 becomes negative. In this case, the CPU 14A proceeds to step 52 and sets a passive transmission mode for the FTP transmission. Thereafter, at step 54, the CPU 14A performs a passive data connection establishing processing.

Figure 5:
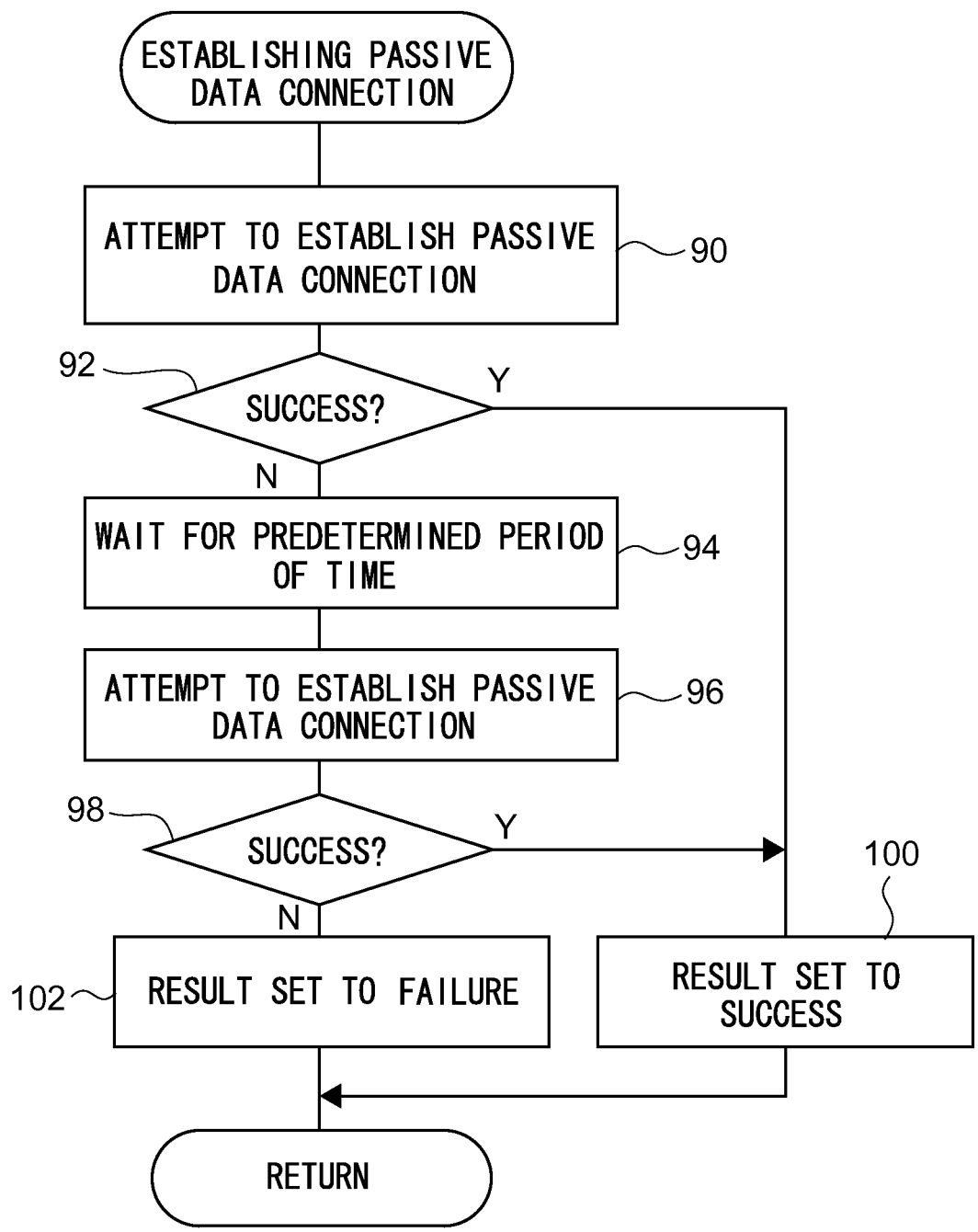
FIG. 5 is a flowchart illustrating an establishment of a passive data transfer connection.

As shown in FIG. 5, in a passive data connection establishing processing, the transmission is executed with the specified FTP server 22 according to the sequence of operations as shown in FIG. 2B. Accordingly, the CPU 14A attempts to establish a data transfer connection in a passive transmission mode with the specified FTP server 22. At the next step 92, based on whether or not the sequence has proceeded to the point at which a notification for establishing a connection is given by the specified FTP server 22, the CPU 14A determines whether or not a data transfer connection with the specified FTP server 22 has succeeded. If the determination result of step 92 is positive, the CPU 14A proceeds to step 100, sets the processing result to indicate that a connection has successfully been established and proceeds to step 56 of FIG. 4.

On the other hand, if the CPU 14A fails to establish a data transfer connection, the determination result of step 92 becomes negative, the CPU 14A proceeds to step 94 and waits for a predetermined period of time. The waiting period at step 94 is set to be substantially longer than the time taken for the resources (ports used for establishing a data transfer connection, for instance) for transmission at the FTP server 22 to be released in a case the CPU 14A fails to establish a data transfer connection using an FTP transmission in a passive transmission mode. When the waiting period ends, the CPU 14A proceeds to step 96 and repeats the attempt to establish a data transfer connection in a passive transmission mode with the specified FTP server 22.

At the next step 98, the CPU 14A determines again whether or not a data transfer connection has successfully been established with the specified FTP server 22. If the determination result at step 98 is positive, the CPU 14A proceeds to step 100. Then, the CPU 14A sets the processing result data to indicate that establishing a connection has succeeded and proceeds to step 56 in FIG. 4. If the CPU 14A repeatedly fails to establish a data transfer connection, the determination result of step 98 is negative, the CPU 14A proceeds to step 102 and sets the processing result data to indicate that establishing a connection has failed and proceeds to step 56 of FIG. 4

In an establishing processing for passive data connection as mentioned above, once the CPU 14A fails to establish a data transfer connection, the CPU 14A re-attempts to establish a data transfer connection after waiting for a period of time that is substantially longer than the time taken for the resources for transmission at the FTP server 22 to be released. Accordingly, even though the required time for data transfer increases, the resources for transmission at the FTP server 22 are prevented from being exhausted.

In step 56 of FIG. 4, the CPU 14A determines if establishing a data transfer connection in a passive transmission mode for the FTP transmission in the above-mentioned passive data connection establishing processing has succeeded. If the determination result is negative, the CPU 14A proceeds through steps 80 and 82, and ends the process. In this case, for the transmission history data, the results of establishing a data transfer connection in active transmission mode and passive transmission mode are respectively set to a "failure" (the results are overwritten if the transmission history data corresponding to the data transfer destination FTP server 22 is already recorded).

Further, during passive data connection establishing processing, establishing a data transfer connection for FTP transmission in a passive transmission mode succeeds, the determination result at step 56 is positive and the CPU 14A proceeds to step 58. At step 58, the CPU 14A performs an FTP data transfer processing for transferring the image data file to the FTP server 22 using the data transfer connection established by the above process. Once the transfer of the image data file is completed and the data transfer connection is closed, the CPU 14A proceeds to step 59 and determines whether or not all of the image data files to be transferred has been transferred to the FTP server 22. If the result is negative, the CPU 14A returns to step 54 and repeats steps 54 though 59 until the determination result at step 59 becomes positive. If the result at step 59 is positive, the CPU 14A proceeds though steps 80 and 82, and ends the process. In this case, for the transmission history data, the result of establishing a data transfer connection in active transmission mode and passive transmission mode are respectively set to a "failure" and a "success" (the results are overwritten if the transmission history data corresponding to the data transfer destination FTP server 22 is already recorded).

Moreover, if the operational mode of the scan-to-server processing is set to automatic setting mode and if a data transfer connection in a previous data transfer to the data transfer destination FTP server 22 of the current scan-to-server processing was established only in a passive transmission mode, the result of step 40 is positive and the CPU 14A proceeds to step 60 and performs the data transfer using only the passive transmission mode. In another words, as an FTP transmission mode, the passive transmission mode is selected (step 60) and a log-in processing is performed at the data transfer destination FTP server 22 so that a control connection is established with the specified FTP server 22 (step 62).

Next, in a similar manner as in steps 54 through 59, the CPU 14A performs a passive data connection establishing processing (step 64) and determines if a data transfer connection in a passive transmission mode for FTP transmission is established (step 66). If the determination result is negative, the CPU 14A proceeds through steps 80 and 82 and ends the process. On the other hand, if the determination result is positive, the CPU 14A performs an FTP data transfer processing (step 68), and determines if all of the image data files to be transferred has been transferred to the FTP server 22 (step 69). Then, the CPU 14A repeats the step 64 through step 69 until the determination result at step 69 becomes positive, proceeds through steps 80 and 82 and ends the process.

If, for instance, the data transfer destination FTP server 22 is the same server and remains unchanged or the like for the scan-to-server processing, the operational mode of the scan-to-server processing is set either to an active mode or a passive mode. If the operational mode of the scan-to-server processing is set to an active mode, the CPU 14A proceeds from step 32 to step 70, and performs a data transfer only in an active transmission mode. In another words, the CPU 14A first sets an active transmission mode for the FTP transmission mode (step 70) and performs a log-in to the data transfer destination FTP server 22, so as to establish a control connection with the specified FTP server 22 (step 72).

Next, similarly to the steps 46 through 51, the CPU 14A attempts to establish a data transfer connection in an active transmission mode (step 74), determines if establishing the data transfer connection in an active transmission mode for FTP transmission succeeds (step 76), and if the determination result is negative, ends the process. On the other hand, if the determination result is positive, the CPU 14A executes an FTP data transfer (step 78) and determines if all of the image data file to be transferred has been transferred to the FTP server 22 (step 79). Then, steps 74 through 79 are repeated until the determination result of the step 79 becomes positive, after which the process is ended.

Furthermore, if the operational mode of the scan-to-server processing is set to a passive mode, the CPU 14A proceeds from step 32 to step 60, and performs a data transfer only using a passive transmission mode as mentioned above. Note that if the operational mode of the scan-to-server processing is an active mode or a passive mode, the transmission history table is not used and the updating of the transmission history table at step 82 is omitted.

Of the FTP data transfer processing mentioned above, the steps for performing the log-in and the log-out, for attempting to establish a data transfer connection, and for performing the FTP data transfer correspond to examples of processes performed by the transmission unit according to the exemplary embodiments. step 82 corresponds to an example of a process performed by the management unit. The other steps are examples of processes performed by the transmission mode specifying unit.

In the above, the embodiments in which three types of modes are disposed (an active mode, a passive mode and an automatic setting mode) are explained. However, the embodiments are not limited thereto. For instance, the operational modes may be omitted so that only the processes corresponding to the automatic setting mode are performed. Nevertheless, if, for instance, the data transfer destination FTP server 22 is always the same, by performing the FTP transmission in a same transmission mode such as an active mode or a passive mode described above, the loads on the main controller 14 can be reduced and storing of the transmission history table onto the storage unit 14C becomes unnecessary.

Furthermore, in the above, an example has been explained of a scan-to-server processing in which the image data file is acquired through scanning of an image of a document by the image scanner 18 and transferring the image data file to the specified FTP server 22 using FTP transmission. However, the exemplary embodiment is not limited thereto, and can be applied to the case in which data received from other devices such as terminal devices and the like is uploaded to the FTP server 22. The data to be transferred is also not limited to the image data file.

Furthermore, embodiments are described in which the FTP data transfer program, which is an example of a control program for image processing device, is stored initially (pre-installed) to the storage unit 14C of the main controller 14 of the image scanning and printing device 12. However, the control program for the image processing device according to the exemplary embodiments may be stored in storage mediums such as a CD-ROM, a DVD-ROM and the like.

What is claimed is:

1. An image processing device comprising:
   a storage unit; and
   at least one processor which executes:
      a transmission unit that transfers data to a file transfer protocol (FTP) server in a specified transmission mode;
      a transmission mode specifying unit that initially specifies an active mode for the transmission mode for transferring the data from the transmission unit to the FTP server, and in response to establishment of a data transfer connection in the active mode failing, specifies a passive mode for the transmission mode for transferring the data from the transmission unit to the FTP server;
      a management unit that, each time the transmission unit transfers the data to the FTP server, stores in the storage unit transmission history data specifying identification data for the FTP server and data indicating, for each transmission mode, whether or not establishment of the data transfer connection in said mode was successful,
   wherein the transmission mode specifying unit specifies the active mode for the transmission mode in response to the transmission history data comprising data indicating that establishment of the data transfer connections in the active mode and in the passive mode was successful, and
   wherein the transmission mode specifying unit specifies the active mode for the transmission mode in response to the transmission history data indicating that there are no modes for which the data transfer connection was successful.

2. The image processing device according to claim 1, wherein
   when the transmission unit transfers data to the FTP server, in response to the storage unit having the transmission history data that includes the identification data for the FTP server to which the data is being transferred, the transmission mode specifying unit specifies, based on the transmission history data, a transmission mode for which the transmission unit has succeeded in establishing the data transfer connection in a previous data transfer to the FTP server to which the data is being transferred.

3. The image processing device according to claim 1, wherein each time the transmission unit transfers data to the FTP server, the management unit determines whether the transmission history data that includes the identification data for the FTP server to which the data is being transferred is stored in the storage unit and, in response to the transmission history being stored in the storage unit, stores new transmission history data in the storage unit by overwriting the transmission history data.

4. The image processing device according to claim 1, wherein when the transmission unit fails to establish the data transfer connection for the data transfer in the passive mode, the transmission unit re-attempts to transfer data to the FTP server in the passive mode after an amount of time has passed that is longer than an amount of time taken by the FTP server to release resources for the transmission.

5. The image processing device according to claim 2 wherein when the transmission unit fails to establish the data transfer connection for the data transfer in the passive mode, the transmission unit re-attempts to transfer data to the FTP server in the passive mode after an amount of time has passed that is longer than an amount of time taken by the FTP server to release resources for the transmission.

6. The image processing device according to claim 3 wherein when the transmission unit fails to establish the data transfer connection for the data transfer in the passive mode, the transmission unit re-attempts to transfer data to the FTP server in the passive mode after an amount of time has passed that is longer than an amount of time taken by the FTP server to release resources for the transmission.

7. The image processing device according to claim 1 wherein:
   the transmission mode includes a first, a second and a third mode;
   in response to an operational mode being set to the first mode, the transmission mode specifying unit initially specifies the active mode for the transmission mode for transferring the data from the transmission unit to the FTP server, and specifies the passive mode for the transmission mode when the transmission unit fails to establish the data transfer connection in the active mode;
   in response to the operational mode being set to the second mode, the transmission mode specifying unit specifies the active mode for the transmission mode for transferring the data from the transmission unit to the FTP server; and
   in response to the operational mode being set to the third mode, the transmission mode specifying unit specifies the passive mode for the transmission mode for transferring the data from the transmission unit to the FTP server.

8. A non-transitory computer readable medium storing a computer program for executing an image processing method, the image processing method comprising:
   transferring data to a file transfer protocol (FTP) server in a specified transmission mode;
   initially specifying an active mode for the transmission mode when the transmission unit transfers the data to the FTP server, and in response to establishment of a data transfer connection in the active mode failing, specifying a passive mode for the transmission mode when transferring the data to the FTP server;
   storing, each time the transmission unit transfers the data to the FTP server, transmission history data specifying identification data for the FTP server and data indicating, for each transmission mode, whether or not establishment of the data transfer connection in said mode was successful;

specifying the active mode for the transmission mode in response to the transmission history data comprising data indicating that establishment of the data transfer connections in the active mode and in the passive mode was successful; and specifying the active mode for the transmission mode in response to the transmission history data indicating that there are no modes for which the data transfer connection was successful.

9. An image processing method comprising:

transferring data to a file transfer protocol (FTP) server in a specified transmission mode; and initially specifying an active mode for the transmission mode when the transmission unit transfers the data to the FTP server, and in response to establishment of a data transfer connection in the active mode failing, specifying a passive mode for the transmission mode when transferring the data to the FTP server;

storing, each time the transmission unit transfers the data to the FTP server, transmission history data specifying identification data for the FTP server and data indicating, for each transmission mode, whether or not establishment of the data transfer connection in said mode was successful;

specifying the active mode for the transmission mode in response to the transmission history data comprising data indicating that establishment of the data transfer connections in the active mode and in the passive mode was successful; and specifying the active mode for the transmission mode in response to the transmission history data indicating that there are no modes for which the data transfer connection was successful.

* * * * *